United States Patent
Gulati et al.

(10) Patent No.: US 9,262,192 B2
(45) Date of Patent: Feb. 16, 2016

(54) VIRTUAL MACHINE DATA STORE QUEUE ALLOCATION

(71) Applicant: VMware, Inc., Palo Alto, CA (US)

(72) Inventors: Ajay Gulati, Palo Alto, CA (US);
Sachin Manpathak, Mountain View, CA (US); Mustafa Uysal, Fremont, CA (US); Luis Useche, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 77 days.

(21) Appl. No.: 14/212,348

(22) Filed: Mar. 14, 2014

(65) Prior Publication Data
US 2015/0169341 A1 Jun. 18, 2015

Related U.S. Application Data

(60) Provisional application No. 61/916,606, filed on Dec. 16, 2013.

(51) Int. Cl.
G06F 9/45 (2006.01)
G06F 9/455 (2006.01)
G06F 9/50 (2006.01)

(52) U.S. Cl.
CPC ............. *G06F 9/45533* (2013.01); *G06F 9/50* (2013.01)

(58) Field of Classification Search
None
See application file for complete search history.

(56) References Cited

U.S. PATENT DOCUMENTS

| | | | |
|---|---|---|---|
| 5,179,702 A * | 1/1993 | Spix et al. ..................... | 718/102 |
| 6,842,906 B1 * | 1/2005 | Bowman-Amuah .......... | 719/330 |
| 8,347,302 B1 * | 1/2013 | Vincent et al. ................ | 718/104 |
| 2003/0149967 A1 * | 8/2003 | Kamada .................. | G06F 9/445 717/148 |
| 2003/0191795 A1 * | 10/2003 | Bernardin et al. ............ | 709/105 |
| 2008/0216073 A1 * | 9/2008 | Yates et al. .................... | 718/100 |
| 2010/0083256 A1 * | 4/2010 | Green et al. .................. | 718/101 |
| 2013/0339975 A1 * | 12/2013 | Busaba et al. ................ | 718/104 |
| 2014/0007121 A1 * | 1/2014 | Caufield et al. ............... | 718/103 |
| 2014/0074641 A1 * | 3/2014 | Wang ........................... | 705/26.3 |
| 2014/0201757 A1 * | 7/2014 | Bird et al. ..................... | 718/104 |
| 2014/0282507 A1 * | 9/2014 | Plondke et al. ................... | 718/1 |
| 2015/0095618 A1 * | 4/2015 | Abdallah ............ | G06F 9/30043 712/214 |

(Continued)

OTHER PUBLICATIONS

Manning, P. et al. *Storage I/O Control Technical Overview and Considerations for Deployment.* VMware vSphere 4.1, Technical White Paper. Published Aug. 3, 2010. Retrieved Oct. 21, 2013. Retrieved from the Internet: URL<http://www.vmware.com/files/pdf/techpaper/VMW-vSphere41-SIOC.pdf>. 12 pages.

(Continued)

*Primary Examiner* — Chameli Das

(57) ABSTRACT

Systems and techniques are described for allocating data store queues to virtual machines. A described technique includes allocating a respective queue to each of a plurality of threads, wherein the queue is configured to queue data requests from the respective thread and for a first data store, determining, for each of a plurality of threads, a respective maximum quantity of pending requests for the thread, wherein a quantity of pending requests sent from the respective queue to the first data store is equal to the maximum quantity of pending requests determined for the thread, determining, for each of the threads, a respective current quantity of operations per second, determining, for each of one or more first threads in the plurality of threads, a respective updated quantity of pending requests, and adjusting, for each first thread, the quantity of pending requests of the first thread sent to the first data store.

30 Claims, 3 Drawing Sheets

(56) References Cited

U.S. PATENT DOCUMENTS

| | | | | |
|---|---|---|---|---|
| 2015/0205587 A1* | 7/2015 | Bates | ............ | G06F 8/41 |
| | | | | 717/148 |
| 2015/0264002 A1* | 9/2015 | Vlachogiannis | ........ | H04L 51/34 |
| | | | | 709/206 |

OTHER PUBLICATIONS

*vSphere Resource Management Guide*. EXS 4.1, ESX 4.1, vCenter Server 4.1, VMware. Published Sep. 30, 2011. Retrieved Nov. 6, 2013. Retrieved from the Internet: URL<http://www.vmware.com/pdf/vsphere4/r41/vsp_41_resource_mgmt.pdf>. 120 pages.

Denneman, F. et al. *VMware vSphere® Storage DRS™ Interoperability*. Technical Marketing Documentation, V 1.0, VMware. Published May 2012. Retrieved Oct. 21, 2013. Retrieved from the Internet: URL< http://www.vmware.com/files/pdf/techpaper/vsphere-storage-drs-interoperability.pdf>. 11 pages.

Little, J. *A Proof for the Queuing Formula*: $L=\lambda W$. Operations Research, vol. 9, Issue 3, May-Jun. 1961. Case Institute of Technology, Cleveland, OH. pp. 383-387.

Gulati, A. et al. *mClock: Handling Throughput Variability for Hypervisor IO Scheduling*. Proceedings of USENIX Symposium on Operating Systems Design and Implementation (OSDI), Vancouver, BC, Canada. Oct. 2010. 15 pages.

Gulati, A. et al. *BASIL: Automated IO Load Balancing Across Storage Devices*. Proceedings of USENIX Conference on File and Storage Technologies (FAST), San Jose, CA. Feb. 2010. 14 pages.

Gulati, A. et al. *Brief Announcement: d-Clock—Distributed QoS in Heterogeneous Resource Environments*. Proceedings of ACM Symposium on Principles of Distributed Computing (PODC'07), Aug. 12-15, 2007, Portland, Oregon, USA. pp. 330-331.

Gulati, A. et al. *Pesto: Online Storage Performance Management in Virtualized Datacenters*. Proceedings of the 2nd ACM Symposium on Cloud Computing (SOCC'11), Oct. 27-28, 2011, Cascais, Portugal. 14 pages.

Gulati, A. et al. *PARDA: Proportional Allocation of Resources for Distributed Storage Acces*. Proceedings of 7th USENIX Conference on File and Storage Technologies, Feb. 24-27, 2009, San Francisco, CA, USA. pp. 85-98.

\* cited by examiner

VIRTUAL MACHINE DATA STORE QUEUE ALLOCATION

BACKGROUND

This document relates to allocating data request queues for virtual machines.

A virtual machine is a software-based abstraction of a physical computer system. In general, any computer program that can be executed on a physical computer system can be executed in a virtual machine using virtualization software. Virtualization software is software that is logically interposed and interfaces with a virtual machine and a physical computer system. Each virtual machine is configured to execute an operating system, referred to herein as a guest OS, and applications. A physical computer system, referred to herein as a host machine, can execute one or more virtual machines.

A virtual machine may have one or more virtual machine disks that store data for the virtual machine. The virtual machine disks may be included on multiple data stores, e.g., the same data store or different data stores, and each data store may include one or more disk arrays.

SUMMARY

In general, one aspect of the subject matter described in this document can be embodied in a technique that includes allocating a respective queue to each of a plurality of threads, wherein the queue is configured to queue data requests from the respective thread and for a first data store, determining, for each of a plurality of threads, a respective maximum quantity of pending requests for the thread, wherein a quantity of pending requests sent from the respective queue to the first data store is equal to the maximum quantity of pending requests determined for the thread, determining, for each of the threads, a respective current quantity of operations per second, determining, for each of one or more first threads in the plurality of threads, a respective updated quantity of pending requests based on whether the current quantity of operations per second for the first thread is less than an expected quantity of operations per second for the first thread, and adjusting, for each first thread, the quantity of pending requests of the first thread sent to the first data store based on the updated quantity of pending requests of the first thread.

These and other aspects can optionally include one or more of the following features. A total quantity of the pending requests sent to the first data store for the plurality of threads may not be greater than a maximum quantity of pending requests for the first data store. The current quantity of operations per second for each of the plurality of threads may not be less than the expected quantity of operations per second for the respective thread. The determining, for each of the first threads, the respective updated quantity of pending requests may comprise setting the updated quantity of pending requests of the respective thread to be greater than the maximum quantity of pending requests of the respective thread.

In some implementations, the current quantity of operations per second for a particular first thread is less than the expected quantity of operations per second for the particular first thread. Adjusting, for the particular first thread, the quantity of pending requests of the particular first thread sent to the first data store may comprise determining that a total quantity of pending requests of the first threads sent to the first data store is greater than a maximum quantity of pending requests for the first data store and, in response thereto, configuring a respective virtual disk of a thread from the plurality of threads to send data requests to a second data store. Determining, for the particular first thread, the updated quantity of pending requests may comprise determining the updated quantity of pending requests using the maximum quantity of pending requests, the current quantity of operations per second, a target latency, and a current latency of the particular first thread. Adjusting, for the particular first thread, the quantity of pending requests of the particular first thread sent to the first data store may comprise adjusting the quantity of pending requests to the updated quantity of pending requests of the particular first thread.

The updated quantity of pending requests $newQ_i$ for the particular first thread i may be determined using Equations (1) through (4) below.

$$newQ_i = minQ_i + \max(0, \alpha \cdot (curOIO_i - minQ_i)) \quad (1)$$

$$minQ_i = \max(expectedIops_i \cdot targetLatency_i, \delta) \quad (2)$$

$$curOIO_i = currentIops_i \cdot currentLatency_i \quad (3)$$

$$\alpha = \min\left(\frac{currentLatency_i}{targetLatency_i}, \frac{targetLatency_i}{currentLatency_i}\right) \quad (4)$$

In Equations (1) through (4), $expectedIops_i$ may be the expected quantity of operations per second, $currentIops_i$ may be the current quantity of operations per second, $targetLatency_i$ may be the target latency, $currentLatency_i$ may be the current latency, and $\delta$ may be a value between zero and one.

In some implementations, the method comprises obtaining, for each of the threads, a respective target latency and the respective expected quantity of operations per second, and wherein determining, for each of the threads, the maximum quantity of pending requests comprises determining the maximum quantity of pending requests, for each of the threads, using the target latency and the expected quantity of operations per second of the thread. The maximum quantity of pending requests $minQ_i$ for a thread i in the plurality of threads may be determined using Equation (2) above.

In Equation (2), $expectedIops_i$ may be the expected quantity of operations per second, $targetLatency_i$ may be the target latency, and $\delta$ may be a value between zero and one.

In some implementations, the method comprises obtaining, for each of one or more second threads in the plurality of threads, a respective maximum quantity of operations per second, determining, for each second thread, that the current quantity of operations per second is greater than the maximum quantity of operations per second for the thread, and adjusting, for each second thread, the quantity of pending requests of the second thread based on determining that the current quantity of operations per second is greater than the maximum quantity of operations per second for the second thread. Each of the threads may be a virtual machine and each of the datasets may comprise a virtual disk. Determining a respective maximum quantity of pending requests may comprise determining, for a particular virtual machine, a quantity of pending requests for each virtual disk allocated to the particular virtual machine, each of the queues configured to queue data requests for the corresponding virtual disk on the first data store. Determining a respective quantity of operations per second may comprise determining, for each of the virtual disks, the respective quantity of operations per second. Determining a respective updated quantity of pending requests may comprise determining, for each of one or more first virtual disks of the virtual disks, the respective updated quantity of pending requests. Adjusting the quantity of pending requests of the first thread sent to the first data store may comprise adjusting, for each first virtual disk, the quantity of pending requests of the first virtual disk based on the updated quantity of pending requests of the first virtual disk. The method may comprise allocating, for each virtual disk, a corresponding data store queue on the first data store, wherein each data store queue holds the pending requests from the corresponding virtual machine sent to the first data store, and wherein the size of the data store queue equal to the quantity of pending requests for the corresponding virtual machine sent to the first data store.

Particular embodiments of the subject matter described in this document can be implemented so as to realize one or more of the following advantages. In some implementations, virtual machines with virtual disks on a data store are assigned individual data store queues. In some implementations, the use of individual data store queues may allow each virtual machine with a virtual disk on the same data store to have different input and output (IO) performance requirements and/or allow a system to provide different performance characteristics for two or more of the virtual machines. In some implementations, as the performance of the virtual machines changes, the system may adjust the size of the respective data store queues or move a virtual disk for a virtual machine to another data store to maintain the IO performance requirements of the virtual machines.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
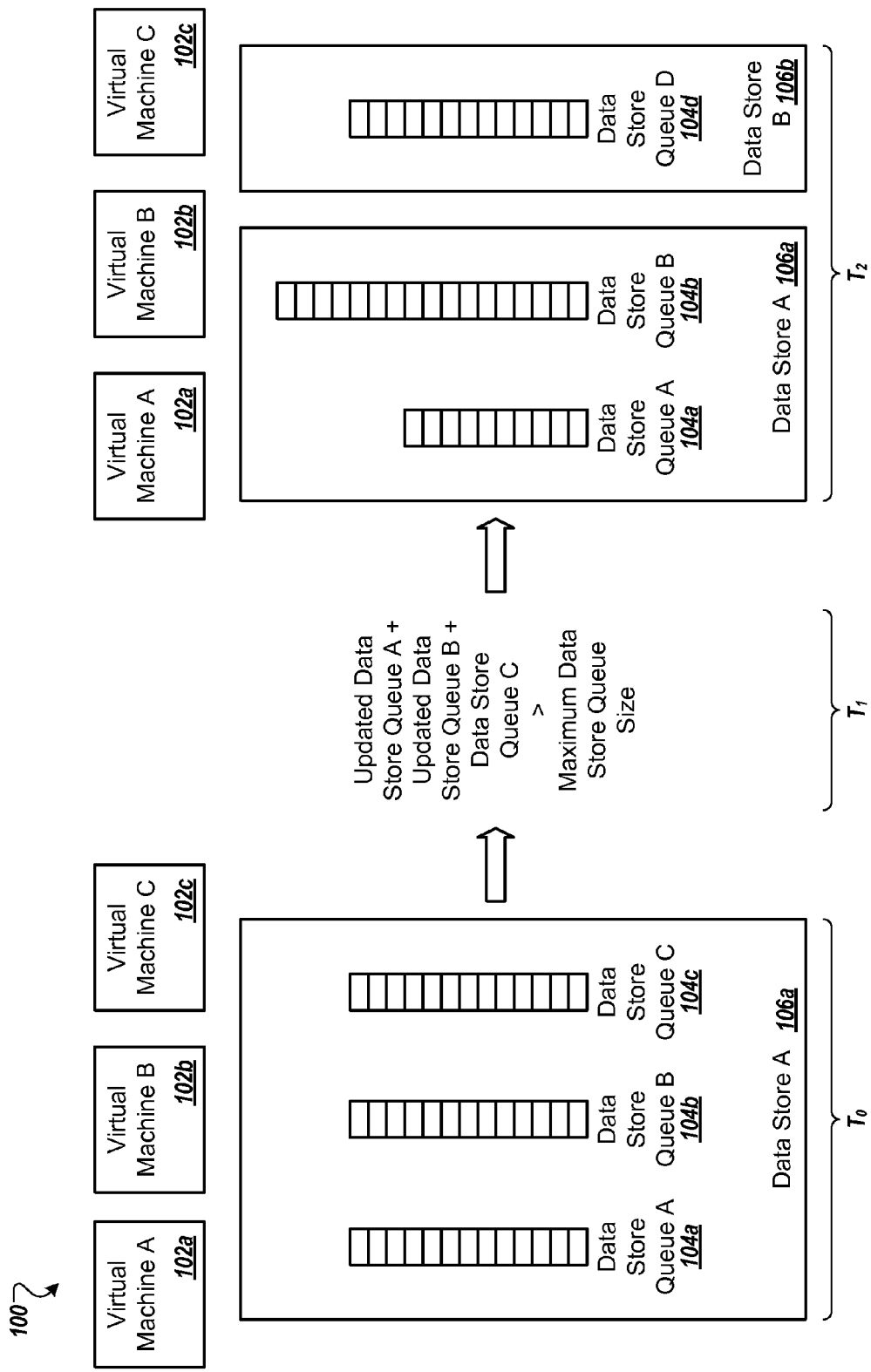
FIG. 1 shows an example environment of virtual machines and corresponding data store queues where each of the data store queues holds data requests for a corresponding virtual disk on the data store.

This specification generally describes a framework to adjust the input and output (IO) performance of virtual machines that access data stored on the same data store. Such a framework can enable dynamic changes to which data store a virtual machine accesses or the size of a data store queue that holds pending data requests for a virtual machine's virtual disk on the data store based on the IO performance requirements of the virtual machine and actual performance of the virtual machine. Each virtual machine that has a virtual disk and a corresponding queue on the same data store may have different performance parameters that are monitored separately from the other virtual machines.

When a virtual machine is created, the system creates a virtual disk on a data store and a queue on the data store that holds pending data requests for the virtual machine. When the virtual machine requires data from or writes data to the virtual disk, the hypervisor monitoring the virtual machine intercepts a data request from the virtual machine to the virtual disk, stores the request in a host queue on a host machine executing the virtual machine, and provides data requests from the host queue to the data store queue, e.g., based on the availability of opening in the data store queue. An IO scheduler for the data store acts on the data requests in the data store queue and removes requests from the data store queue once a request is completed, e.g., by providing requested data to the corresponding virtual machine or writing data to the data store.

Each virtual machine executing on the host has a separate host queue that stores the data requests for that particular virtual machine. That is, a hypervisor intercepts data requests issued by the virtual machine and adds the requests to the host queue for the virtual machine.

When the IO scheduler removes a request from the data store queue for a given virtual disk, the hypervisor determines whether the corresponding host queue contains additional data requests for the corresponding virtual disk and provides requests to the data store queue until the data store queue is full.

The maximum size of a data store queue determines a maximum quantity of data requests for the virtual disk and from the respective virtual machine to which the data store queue is allocated that the data store queue can hold. Thus, the maximum size of the data store queue determines the latency of the responses provided to the virtual machine or the write latency for a write request, and the quantity of operations per second for the virtual machine. As the maximum size of the data store queue increases, the data store queue can hold more pending data requests and have a lower latency and a higher quantity of operations per second, i.e., because the IO scheduler can process multiple requests in the queue at the same time.

For example, the IO performance requirements for a given virtual machine may include a target latency, an expected quantity of operations per second, and, optionally, a maximum quantity of operations per second. A hypervisor and a storage IO controller can monitor the performance of the virtual machine and increase or decrease the size of the data store queue allocated to the virtual machine based on the performance of the virtual machine and other virtual machines with virtual disks on the same data store to ensure that the IO performance requirements for the given virtual machine are being met. If the storage IO controller determines that the IO performance requirements of the virtual machine cannot be met by the current data store, a distributed resource scheduler is notified so that the virtual machine's virtual disk may be migrated to another data store that will meet the IO performance requirements, e.g., and the virtual machine receives a queue for the virtual disk on the other data store.

FIG. 1 shows an example environment 100 of virtual machines 102a-c and corresponding data store queues 104a-d where each of the data store queues holds data requests for a corresponding virtual disk on a data store. As the current IO performance of the virtual machines 102a-c, e.g., the current quantity of input and output operations per second of the virtual machines 102a-c, change, a storage IO controller, e.g., included in a hypervisor, monitors the IO performance of the virtual machines 102a-c and the respective virtual disks to determine whether the IO requirements are met. Monitoring the IO requirements of virtual machines is described in more detail below with reference to FIG. 2.

During time period $T_0$, each of the virtual machines 102a-c has a data store queue 104a-c, respectfully, that holds data requests for a corresponding virtual disk on a data store A 106a. For example, each of the virtual disks may be a file format that represents a virtual hard disk drive for the corresponding virtual machine. A virtual machine may have multiple virtual disks on the same or different data stores, and one data store queue for each of the virtual disks. The virtual disks may correspond with any type of file stored on the data stores and accessed by the virtual machine.

As each of the virtual machines 102a-c send data requests to the corresponding virtual disks, a corresponding hypervisor monitoring the execution of the virtual machine receives the data requests, and stores the data requests in a host queue on the host executing the virtual machine, where the host queue is specific to the virtual machine that sent the data request. The hypervisor monitors the corresponding data store queue and, when the corresponding data store queue includes an available opening, provides a request from the host queue to the data store queue. When a virtual machine has multiple virtual disks, the hypervisor may place requests from the virtual machine to the virtual disks in separate host queues or in the same host queue.

Generally, as the maximum size of a data store queue increases, i.e., as the maximum number of pending requests that can be added to the data store queue at a given time increases, the latency of the responses by the IO scheduler decreases, assuming all other properties of the data store, the data store queue, and the virtual machine remain the same.

When a data store queue is full, i.e., when the data store queue includes a maximum number of pending data requests on which an IO scheduler in the data store is acting, the data store queue stops accepting additional requests and the hypervisor that monitors the virtual machine tracks additional requests in the host queue that corresponds with the data store queue and sends the additional requests to the data store queue as the IO scheduler responds to previous requests and removes the previous requests from the data store queue.

The storage IO controller determines, during time period $T_0$, that the IO performance requirements of the virtual machine A 102a and the virtual machine C 102c are being met and that the IO performance requirements of the virtual machine B 102b are not being met. For example, the storage IO controller may determine that the current quantity of IO operations for the virtual machine A 102a is greater than the expected quantity of IO operations and that the size of the data store queue A 104a can be decreased while continuing to meet the expected quantity of IO operations for the virtual machine A 102a, e.g., as a smaller data store queue will still be able to meet the expected quantity of IO operations.

For the virtual machine 102b, the storage IO controller may determine that the current quantity of IO operations per second is less than the expected quantity of IO operations per second and that the size of the data store queue B 104b must be increased to meet the IO performance requirements for the virtual machine B 102b, e.g., since a larger data store queue size will increase the quantity of IO operations per second.

Further, the storage IO controller may determine that the IO performance requirements of the virtual machine C 102c are being met and that the size of the data store queue for the virtual machine C 102c should not be decreased since a reduction of the data store queue size may prevent the virtual machine C 102c from continuing to meet IO performance requirements.

The storage IO controller, during time period $T_1$, determines an updated size for each data store queue, i.e., so that the performance requirements for the corresponding virtual machines can be satisfied, and determines that the total size of the updated data store queues, i.e., the total size of data store queues 104a, 104b, and 104c that will be necessary to meet the current performance requirements of virtual machines 102a, 102b, and 102c, is greater than a maximum data store queue size for the data store A 106a. Determining the maximum data store queue size for a given data store queue and updating the size of a data store queue are described in more detail below with reference to FIG. 2.

The storage IO controller notifies a distributed resource scheduler that the total size of the updated data store queues is greater than the maximum data store queue size for the data store A 106a and that one of the virtual machines 102a-c needs a virtual disk on another data store. During time period $T_2$, the distributed resource scheduler indicates that the virtual machine C's virtual disk C may be migrated to a data store B 106b and that the virtual machine C may be assigned a corresponding data store queue D 104d on the data store B 106b, and the storage IO controller adjusts the sizes of the data store queues A and B 104a-b and assigns the data store queue D 104d, on the data store B 106b, to the virtual machine 102c. The distributed resource scheduler is described in more detail below with reference to FIG. 2.

In this example, the size of the data store queue for the virtual machine C 102c remains the same and a new data store queue is created on the data store B 106b for the virtual machine C 102c, e.g., when the virtual disk C is migrated to the data store B 106b. In some other examples, however, the size of the data store queue allocated to the virtual machine C 102c may change when the virtual disk C for the virtual machine C 102c is moved from one data store to another.

In some implementations, the data stores 106a-b may track pending data requests using a method other than queues. In these implementations, the hypervisor may monitor the host queues of the virtual machines 102a-c and send a maximum quantity of pending requests from the host queues to the corresponding data store, e.g., equal to the quantity of requests the data store queues can hold. As the maximum quantity of pending requests sent to the data store increases and an IO scheduler on the data store acts on the requests, the latency of responses to the requests decreases and the throughput for the virtual machine and corresponding virtual disk increases.

Figure 2:
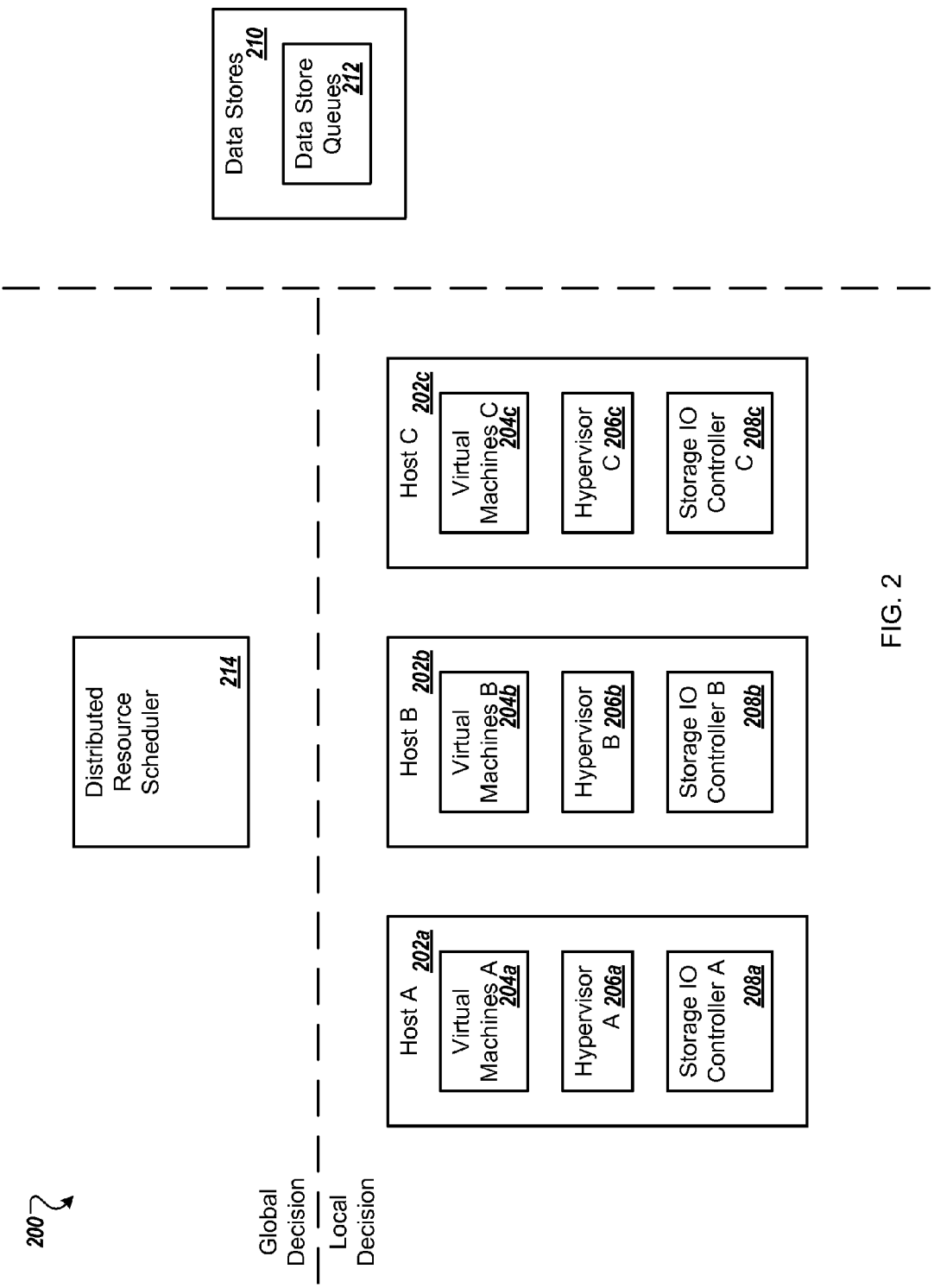
FIG. 2 shows an example architecture of a system configured to monitor the performance of multiple virtual machines and their corresponding virtual disks and adjust the sizes of data store queues allocated to the virtual machines.

FIG. 2 shows an example architecture of a system 200 configured to monitor the performance of multiple virtual machines and their corresponding virtual disks and adjust the sizes of data store queues allocated to the virtual machines. The system 200 includes multiples hosts 202a-b, each of which run one or more virtual machines 204a-c, respectively, and a hypervisor 206a-c, respectively, that monitors the virtual machines 204a-c.

When one of the virtual machines 204a-c is created, the corresponding host 202a-c obtains an expected quantity of IO operations per second, and a target latency for the virtual machine. The expected quantity of IO operations per second and the target latency may be settings for the execution of the virtual machine that are specified by a system administrator and/or user of the virtual machine. The corresponding hypervisor 206a-c or a corresponding storage IO controller 208a-c determines a minimum data store queue size for the virtual machine, e.g., using one or more of the IO performance requirements of the virtual machine.

When one of the virtual machines 204a-c is created, the virtual machine is allocated one or more virtual disks, i.e., virtual storage devices. Each of the virtual disks is assigned to a physical data store that stores the virtual disk, i.e., the physical data store stores the data that the virtual machine writes to the virtual disk. When a virtual machine attempts to read from or write to a virtual disk, the hypervisor managing the virtual machine receives the request, stores the request in a host queue, and, when the corresponding data store queue has capacity for the request, transmits the read or write request to the data store that is assigned to the virtual disk, e.g., by sending the request to the corresponding data store queue. The IO scheduler then accesses the request in the data store queue and performs an action based on the request, e.g., a corresponding read or write action.

For example, a virtual machine C may have a virtual disk C and a corresponding data store queue C on a data store A. When the virtual machine C requires data from or writes data to the virtual disk C, the virtual machine C sends a request to the corresponding hypervisor C, and the hypervisor places the request in a corresponding host queue, determines whether the data store queue C 104c has an opening for the request, and, if so, places the request in the data store queue C 104c.

In some implementations, when a virtual machine is allocated multiple virtual disks, each of the virtual disks may have different performance requirements and the hypervisor or the storage IO controller determines a minimum data store queue size for each of the virtual disks. Each of the virtual disks for a virtual machine may be on the same data store or on different data stores. The example below is described with reference to a virtual machine that is allocated a single virtual disk but may be performed separately for each virtual disk allocated to a given virtual machine. For example, the expected IO operations per second may be specific to a particular file, e.g., a particular virtual disk, instead of a virtual machine.

The corresponding storage IO controller 208a-c identifies a data store 210 that will store a virtual disk for the virtual machine and allocates a virtual disk and a data store queue 212, which holds IO requests for the virtual disk, on the data store 210. The data store queue has a maximum size that determines the maximum quantity of pending requests for the corresponding virtual disk that the data store queue can hold. The IO access requests may be read access request, write access requests, or a combination of the two.

For example, the storage IO controller A 208a can determine the minimum data store queue size $minQ_i$ for a virtual machine i using Equation (5) below.

$$minQ_i = expectedIops_i \cdot targetLatency_i \quad (5)$$

In Equation (5), $expectedIops_i$ is the expected quantity of IO operations per second, and $targetLatency_i$ is the target latency for the virtual machine i. In some implementations, a storage IO controller determines the minimum data store queue size $minQ_i$ for a virtual machine i using Equation (6) below.

$$minQ_i = max(expectedIops_i \cdot targetLatency_i, \delta) \quad (6)$$

In Equation (6), $\delta$ is a constant value between zero and one for cases where the expected quantity of IO operations per second is zero, e.g., to prevent a data store queue size of zero when the storage IO controller determines that there are no expected IO operations for a virtual machine or a virtual disk during a certain period of time. For example, when a virtual machine has multiple virtual disks, the storage IO controller may determine that the virtual machine is likely to access a first virtual disk, where the expected quantity of IO operations per second is greater than zero, but is not likely to access a second virtual disk, where the expected quantity of IO operations per second for the second virtual disk is zero.

The storage IO controller A 208a may send the minimum data store queue size to a distributed resource scheduler 214 and request a data store for the virtual machine i's virtual disk. The distributed resource scheduler 214 may execute on a server separate from the data stores 210 or on one of the servers that hosts a portion of the data stores 210.

The distributed resource scheduler 214 identifies one of the data stores 210 that has capacity to respond to IO requests of the virtual machine i, host the corresponding virtual disk, and meet the IO performance requirements of the virtual machine i. The distributed resource scheduler 214 assigns the virtual disk to the identified data store and a corresponding storage IO controller 208 determines that the virtual machine i is assigned to the identified data store. When the distributed resource scheduler 214 assigns the virtual disk to the virtual machine the system 200, e.g., a data store, may create a corresponding data store queue.

The storage IO controllers 208a-c and/or the hypervisors 206a-c monitor the performance of the virtual machines 204a-c and their virtual disks and the storage IO controllers 208a-c determine whether to adjust the sizes of one or more of the data store queues allocated to the virtual machines 204a-c.

In particular, when the IO performance requirements of one or more virtual machines with a virtual disk on the same data store are not met, e.g., the current quantity of IO operations for the virtual machines is less than an expected quantity of IO operations per second or the current latency is greater than the target latency, the storage IO controllers 208a-c may adjust the size of the data store queues and/or send a request to the distributed resource scheduler 214 to migrate a virtual machines' virtual disk to another data store. For example, the distributed resource scheduler 214 may identify one or more other data stores that can respond to data requests of the virtual machines and host the virtual machines' virtual disks such that all of the virtual machines will meet their IO performance requirements.

When each of the data stores 210 is created, the data store is assigned a maximum data store queue size that is determined using one or more properties of the data store, for example using the size of the data store, e.g., in bytes, and a latency of the data store. As the distributed resource scheduler 214 allocates virtual disks to the data stores 210, the distributed resource scheduler 214 monitors the current IO performance of the data stores 210.

When the distributed resource scheduler 214 receives information indicating that one or more virtual disks need to be migrated to a new or a different data store, the distributed resource scheduler 214 identifies a data store based on the virtual disk, the corresponding virtual machine, and/or the data store. For example, the distributed resources scheduler 214 identifies a data store for a virtual machine using the requirements of the virtual machine and the available resources for the data store. For example, an IO scheduler for a single data store may respond to data requests for a first virtual machine with a five millisecond target latency and a second virtual machine with a ten millisecond target latency while maintaining the separate latencies for the two virtual machines, e.g., by having the size of the data store queue allocated to the first virtual machine larger than the size of the data store queue allocated to the second virtual machine. When the distributed resource scheduler 214 receives a request to identify a data store for a third virtual machine having a twenty-five second target latency, the distributed resource scheduler 214 may assign the third virtual machine to the same data store as the first and second virtual machines if the data store can meet the IO performance requirements of the third virtual machine while continuing to meet the requirements of the first and second virtual machines.

The distributed resource scheduler 214 may use any appropriate algorithm to identify a data store for a virtual machine. In some implementations, the distributed resource scheduler 214 uses a performance model indicating the expected number of IO operations at a maximum latency from a data store.

The performance model may be built using active performance measurements or passive performance observations. For example, the distributed resource scheduler 214 may determine whether the data store has sufficient extra capacity to accommodate the new workload, e.g., for the virtual machine. The distributed resource scheduler 214 may select the data store with the minimum overall latency as the best candidate that can fulfill the new additional workload.

The storage IO controllers 208a-c can ensure that the IO requirements for the virtual machines 204a-c are met using any of a variety of techniques.

In some examples, when one of the storage IO controllers 208a-c determines that the IO performance requirements for a virtual machine are not being met, the storage IO controller adjusts the sizes of the data store queues allocated to the other virtual machines that access the same data store. That is, the storage IO controllers may decrease the data store queue sizes of one or more virtual machines that are exceeding IO performance requirements, e.g., to reduce the IO performance while maintaining an acceptable level of IO performance, and may increase the data store queue sizes of one or more virtual machines that are not achieving IO performance requirements, e.g., to increase the IO performance, to maintain the IO performance requirements of all the virtual machines.

For example, the storage IO controller may determine a current average outstanding IO request $curOIO_i$ for a virtual machine i using Equation (7) below.

$$curOIO_i = currentIops_i \cdot currentLatency_i \qquad (7)$$

In Equation (7), $currentIops_i$ is the current quantity of operations per second, and $currentLatency_i$ is the current latency of the virtual machine i.

The storage IO controller determines a new data store queue size $newQ_i$ for the virtual machine i using Equation (8) below.

$$newQ_i = minQ_i + \max(0, \alpha \cdot (curOIO_i - minQ_i)) \qquad (8)$$

In Equation (8), $$\alpha = \min\left(\frac{currentLatency_i}{targetLatency_i}, \frac{targetLatency_i}{currentLatency_i}\right),$$

$targetLatency_i$ is the target latency, and $currentLatency_i$ is the current latency of the virtual machine i.

The new data store queue size $newQ_i$ accounts for whether or not the IO performance requirements of the respective virtual machine are being met. When the IO performance requirements of a virtual machine are not being met, curOIO will be less than or equal to minQ for the virtual machine, and $newQ_i = minQ_i + 0 = expectedIops_i \cdot targetLatency_i$.

When the IO performance requirements of a virtual machine are being met, curOIO will be greater than minQ, and $newQ_i = minQ_i + \alpha \cdot (curOIO_i - minQ_i)$ where $\alpha$ is a degree of reduction for the data store queue size and depends on how close the current latency of the virtual machine is to the target latency. When the IO performance requirements of the virtual machine are being met, the minimum data store queue size minQ will be less than or equal to the current data store queue size for the virtual machine and the new data store queue size newQ will be less than or equal to the current data store queue size.

In some examples, the current latency is slower than the target latency while the IO performance requirements of the virtual machine are met. To account for this, the degree of reduction $$\alpha = \min\left(\frac{currentLatency_i}{targetLatency_i}, \frac{targetLatency_i}{currentLatency_i}\right)$$

is taken as the minimum of two ratios to ensure that the new data store queue size is smaller than the current data store queue size for a virtual machine that is meeting IO performance requirements.

In some implementations, when the maximum data store queue size for a data store has not been allocated and the IO performance requirements of a virtual machine are not being met, the data store queue of the virtual machine that is not meeting IO performance requirements may be adjusted, e.g., using $newQ_i = minQ_i + 0 = expectedIops_i \cdot targetLatency_i$, while the sizes of the other data store queues for the data store remain the same.

In some examples, when the storage IO controllers 208a-c determine that the IO performance requirements of all virtual machines with virtual disks on the same data store and configured to data store queue IO requests to the same data store are being met, e.g., $MaxDataStoreQDepth_{ds} > \Sigma_{\forall i} newQ_i$ for virtual machines i that access data store ds, the storage IO controllers 208a-c may increase the size of one or more of the virtual machines' data store queues. For example, the data store queues may be increased by a fixed percentage, e.g., ten percent, up to the maximum data store queue size. The percentage may be determined such that the sizes of all the data store queues will be increased by the same percent and all of the available data store queue size will be used.

In some implementations, when the IO performance requirements of all of the virtual machines that access the same data store are being met, the sizes of the data store queues are increased based on a ratio between the minimum data store queue size and the current average outstanding IO requests, e.g., to use the extra resources available to the data store while maintaining any maximum quantities of operations per second. For example, virtual machines that have a smaller ratio may receive a larger percentage increase for their respective data store queue size compared to virtual machines that have a larger ratio.

In some implementations, when the IO performance requirements of all of the virtual machines that access the same data store are being met, the system 200, e.g., one of the storage IO controllers 208a-c, may determine an unallocated data store queue size, e.g., the difference between the current and maximum data store queue size for the data store, and allocate the unallocated data store queue size evenly between the virtual machines that access the data store. For example, when five virtual machines have virtual disks on a data store and the unallocated data store queue size is ten, the sizes of each of the data store queues for the five virtual machines may be increased by two.

In some implementations, a virtual machine may have a maximum quantity of IO operations per second. For example, when a first organization agrees to use a virtual machine that is hosted by a second organization, an agreement to use the virtual machine may include a maximum quantity of IO operations per second. In these implementations, when a current quantity of IO operations per second is greater than the maximum quantity of IO operations per second, the respective storage IO controller 208a-c may adjust the size of the data store queue for the virtual machine to maintain the maximum quantity of IO operations per second.

In some examples, when the performance requirements of one of the virtual machines with a virtual disk on a given data store are not being met, the storage IO controllers 208a-c or the distributed resource scheduler 214 identify a virtual machine currently accessing data from the data store that should access data from a different data store.

The determination of which virtual machine should be moved from a first data store to a second data store may be made based on the size of the respective data store queues for the virtual machines with virtual disks on the first data store. For example, after determining updated data store queue sizes for the virtual machines, the virtual machine with the smallest data store queue size that allows the first data store to have a total data store queue size less than a respective maximum total data store queue size may be moved from the first data store to the second data store.

As another example, the determination of which virtual machine to move from a first data store to a second data store may be made based on the size of a virtual disk on the first data store. For example, the virtual machine with the smallest virtual disk and a data store queue size that allows the first data store to have a total data store queue size less than a respective maximum total data store queue size may be moved from the first data store to the second data store.

Thus, in some cases, the virtual machine that is not meeting IO requirements may be moved to a different data store while, in other cases, a virtual machine that is meeting IO requirements may be moved.

In some implementations, when the distributed resource scheduler 214 is unable to identify one of the data stores 210 with available bandwidth for a virtual machine, the system 200, e.g., the distributed resource scheduler 214, notifies an administrator of the system 200 that the IO performance requirements of all the virtual machines 204*a-c* cannot be met.

In some implementations, when the IO performance requirements of a virtual machine are not being met, the storage 10 controllers 208*a-c* may perform a combination of the techniques described above to improve the performance of the virtual machine. For example, the storage 10 controllers 208*a-c* may increase the data store queue size of a virtual machine that is not meeting 10 performance requirements. The storage 10 controllers 208*a-c* may increase the data store queue size of a virtual machine that is not meeting 10 performance requirements while decreasing the data store queue size of another virtual machine that is meeting 10 performance requirements. The storage 10 controllers 208*a-c* may increase the size of a data store queue for a first virtual machine, decrease the size of a second virtual machine, and move another virtual machine's virtual disk from a first data store to a second data store, where the first virtual machine and the other virtual machine may or may not be the same virtual machine.

In some implementations, the hosts 202*a-c* may include other types of threads instead of or in addition to the virtual machines 204*a-c*. In these implementations, the storage 10 controllers 208*a-c* may allocate data store queues to each of the threads and monitor the size of the data store queues to ensure that IO performance requirements of the threads are met, e.g., as described above with reference to allocating and monitoring data store queues for virtual machines 204*a-c*.

In some implementations, the storage 10 controllers 208*a-c* may reside on servers hosting the data stores 210. For example, each server that hosts a data store may include a storage 10 controller that monitors the performance of the virtual disks and the corresponding queues hosted on the server.

Figure 3:
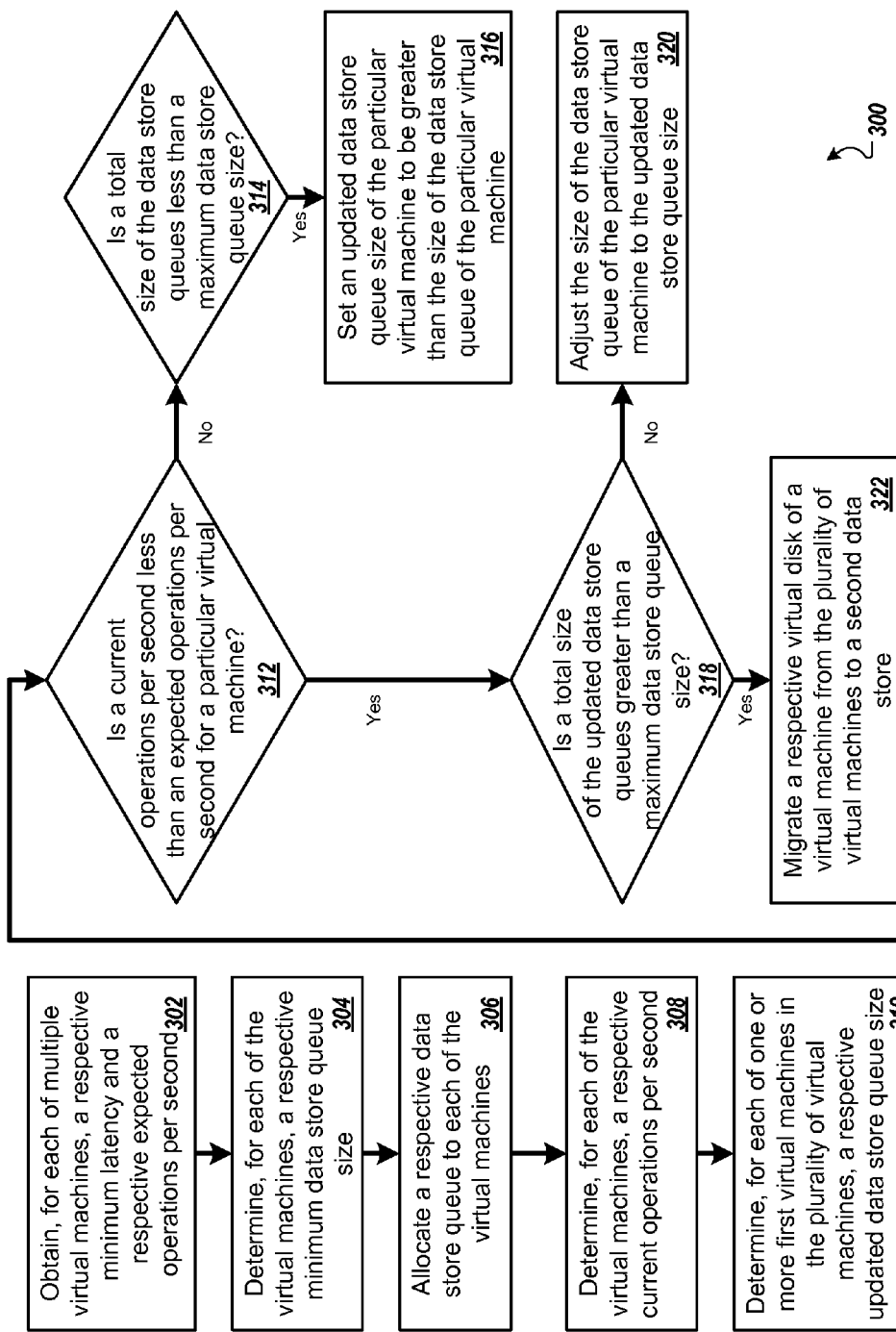
FIG. 3 shows a flowchart for an example of a process for adjusting the size of a data store queue that holds IO requests for a virtual disk as implemented on one or more data processing apparatus.

FIG. 3 shows a flowchart for an example of a process 300 for adjusting the size of a data store queue that holds IO requests for a virtual disk as implemented on one or more data processing apparatus.

At 302, a storage 10 controller, e.g., one of the storage 10 controllers 208*a-c* of FIG. 2, obtains, for each of multiple virtual machines, a respective target latency and a respective expected quantity of operations per second. For example, the target latency and the expected quantity of operations per second for each virtual machine may be pre-determined by a system administrator or a user of the virtual machine.

In some implementations, an administrator can define an IO service class with a throughput goal and a latency goal and assign virtual machines to particular service classes so that each virtual machine has the goals of the service class. In some examples, an administrator may determine the service classes of all virtual machines running on a specific host or a specific cluster, e.g., of hosts. The IO objectives are then inherited from the service class that is assigned to the virtual machine.

In some implementations, an administrator can perform an offline capacity planning experiment to determine the latency and throughput goals of a particular virtual machine by running a workload on a test setup.

At 304, the storage IO controller determines, for each of the virtual machines, a respective minimum data store queue size. The storage IO controllers may determine the minimum data store queue size using the target latency and the expected quantity of operations per second of the virtual machine.

At 306, the storage IO controller allocates a respective data store queue to each of the virtual machines. A size of the data store queue is equal to the minimum data store queue size determined for the virtual machine and the data store queue is configured to data store queue data requests for a virtual disk on a first data store. For example, each of the virtual machines may have a corresponding storage IO controller that allocates the data store queues to the respective virtual machine. A single storage IO controller may allocate data store queues for multiple virtual machines. In some examples, when a virtual disk is allocated for a virtual machine, a corresponding data store queue is automatically allocated to the virtual machine.

At 308, the storage IO controller determines for each of the virtual machines, a respective current quantity of operations per second.

At 310, the storage IO controller determines for each of one or more first virtual machines in the plurality of virtual machines, a respective updated data store queue size. The storage IO controllers may determine the updated data store queue sizes using the minimum data store queue size, the current quantity of write operations per second, a target latency, and a current latency of a particular first virtual machine.

In some implementations, the updated data store queue size is based on whether the current quantity of operations per second for the first virtual machine is less than the expected quantity of operations per second for the first virtual machine, e.g., the determination made at step 312.

At 312, the storage IO controller determines whether a current quantity of operations per second is less than an expected quantity of operations per second for a particular virtual machine. For example, the storage IO controllers determine whether the IO performance requirements of a corresponding virtual machine are met.

At 314, based on determining that the current quantity of operations per second is not less than the expected quantity of operations per second for all of the virtual machines, the storage IO controller determines whether a total size of the data store queues is less than a maximum data store queue size. For example, each of the storage IO controllers that correspond with at least one of the plurality of virtual machines determines that the IO performance requirements of the corresponding virtual machines are met.

At 316, based on determining that the total size of the data store queues is less than the maximum data store queue size, the storage IO controller sets an updated data store queue size of the particular virtual machine to be greater than the size of the data store queue of the particular virtual machine. For example, the storage IO controllers increase the data store queue sizes of one or more of the corresponding virtual machines, e.g., based on the available data store queue size. In some implementations, the data store queue sizes of one or more of the data store queues may not be increased, e.g., based on the previous size of the data store queues and/or IO performance requirements of the respective virtual machines.

If the storage IO controller determines that the total size of the data store queues is not less than the maximum data store queue size, the storage IO controller does not adjust the sizes of the data store queues.

At 318, based on determining that the current quantity of operations per second is less than the expected quantity of operations per second for the particular virtual machine, the storage IO controller determines whether a total size of the updated data store queues is greater than a maximum data store queue size. For example, one of the storage IO controllers, or another component in the system 200, determines whether a sum of the updated data store queue sizes corresponding to each of the plurality of virtual machines is greater than the maximum data store queue size.

At 320, based on determining that the total size of the updated data store queues is not greater than the maximum data store queue size, the storage IO controller adjusts the size of the data store queue of the particular virtual machine to the updated data store queue size. For example, the storage IO controller increases the size of the data store queue of the particular virtual machine. The storage IO controllers may adjust the sizes of one or more other data store queues. For example, one or more additional data store queue sizes may be increased, for virtual machines that are not meeting IO performance requirements, and one or more data store queue sizes may be decreased, for virtual machines that are meeting IO performance requirements.

At 322, based on determining that the total size of the updated data store queues is greater than the maximum data store queue size, the storage IO controller migrates a respective virtual disk of a virtual machine from the plurality of virtual machines to a second data store. For example, the virtual machine's virtual disk is migrated to the second data store and a new data store queue on the second data store is allocated to the virtual machine. The virtual machine may be the same as the particular virtual machine or may be a different virtual machine.

The order of steps in the process 300 described above is illustrative only, and adjusting the size of the data store queue can be performed in different orders. For example, the storage IO controller may perform step 312 prior to performing step 310.

In some implementations, the process 300 can include additional steps, fewer steps, or some of the steps can be divided into multiple steps. For example, the storage IO controller may perform steps 304 through 310 and may adjust, for each first virtual machine, the size of the data store queue of the first virtual machine based on the updated data store queue size.

In some implementations, the storage IO controller obtains, for each of one or more second virtual machines in the virtual machines, a respective maximum quantity of operations per second, determines, for each second virtual machine, that the current quantity of operations per second is greater than the maximum quantity of operations per second for the virtual machine, and adjusts, for each second virtual machine, the size of the data store queue of the second virtual machine based on determining that the current quantity of operations per second is greater than the maximum quantity of operations per second for the second virtual machine.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A computer-implemented method comprising:
  allocating a respective data store queue to each of a plurality of virtual machines, wherein each data store queue is configured to queue data requests from the respective virtual machine using an initial maximum data store queue size and for a respective virtual disk of a first data store, wherein each virtual machine is associated with a corresponding virtual disk of the first data store and only the virtual machines in the plurality of virtual machines have a virtual disk of the first data store;

determining, for each of the plurality of virtual machines, a respective current maximum quantity of pending requests for the virtual machine, wherein a quantity of pending requests sent from the respective data store queue to the first data store is at most equal to the current maximum quantity of pending requests determined for the virtual machine;

determining, for each of the virtual machines, a respective current quantity of operations per second;

determining, for each of one or more first virtual machines in the plurality of virtual machines, a respective updated maximum queue size using the respective current maximum quantity of pending requests for the virtual machine based on whether the current quantity of operations per second for the first virtual machine is less than an expected quantity of operations per second for the first virtual machine; and updating, for each first virtual machine, the size of the data store queue for the first virtual machine sent to the first data store using the updated maximum queue size for the first virtual machine.

2. The method of claim 1 wherein a total quantity of the pending requests sent to the first data store for the plurality of virtual machines is not greater than a maximum quantity of pending requests for the first data store and the current quantity of operations per second for each of the plurality of virtual machines is not less than the expected quantity of operations per second for the respective virtual machine, and wherein determining, for each of the first virtual machines, the respective updated maximum queue size comprises:

setting the updated maximum queue size for the respective virtual machine to be greater than the maximum quantity of pending requests of the respective virtual machine.

3. The method of claim 1 wherein the current quantity of operations per second for a particular first virtual machine is less than the expected quantity of operations per second for the particular first virtual machine.

4. The method of claim 3 wherein updating, for the particular first virtual machine, the size of the data store queue for the particular first virtual machine sent to the first data store comprises:

determining that a total quantity of pending requests of the first virtual machines sent to the first data store is greater than a maximum quantity of pending requests for the first data store and, in response thereto, configuring a respective virtual disk of a virtual machine from the plurality of virtual machines to send data requests to a second data store.

5. The method of claim 3, wherein:

determining, for the particular first virtual machine, the updated maximum queue size comprises determining the updated maximum queue size using the current maximum quantity of pending requests, the current quantity of operations per second, a target latency, and a current latency of the particular first virtual machine; and updating, for the particular first virtual machine, the size of the data store queue for the particular first virtual machine sent to the first data store comprises updating the size of the data store queue to the updated maximum queue size for the particular first virtual machine.

6. The method of claim 5, wherein the updated maximum queue size $newQ_i$ for the particular first virtual machine i is $$newQ_i = minQ_i + \max(0, \alpha \cdot (curOIO_i - minQ_i))$$

where $$minQ_i = \max(expectedIops_i \cdot targetLatency_i, \delta)$$

$$curOIO_i = currentIops_i \cdot currentLatency_i$$

$$\alpha = \min\left(\frac{currentLatency_i}{targetLatency_i}, \frac{targetLatency_i}{currentLatency_i}\right)$$

where $expectedIops_i$ is the expected quantity of operations per second, $currentIops_i$ is the current quantity of operations per second, $targetLatency_i$ is the target latency, $currentLatency_i$ is the current latency, and $\delta$ is a value between zero and one.

7. The method of claim 1, further comprising:

obtaining, for each of the virtual machines, a respective target latency and the respective expected quantity of operations per second; and wherein determining, for each of the virtual machines, the maximum quantity of pending requests comprises determining the maximum quantity of pending requests, for each of the virtual machines, using the target latency and the expected quantity of operations per second of the virtual machine.

8. The method of claim 7, wherein the maximum quantity of pending requests $minQ_i$ for a virtual machine i in the plurality of virtual machines is $$minQ_i = \max(expectedIops_i \cdot targetLatency_i, \delta)$$

where $expectedIops_i$ is the expected quantity of operations per second, $targetLatency_i$ is the target latency, and $\delta$ is a value between zero and one.

9. The method of claim 1 wherein:

determining a respective maximum quantity of pending requests comprises determining, for a particular virtual machine, a quantity of pending requests for each virtual disk allocated to the particular virtual machine, each of the data store queues configured to queue data requests for the corresponding virtual disk on the first data store;

determining a respective quantity of operations per second comprises determining, for each of the virtual disks, the respective quantity of operations per second;

determining a respective updated maximum queue size comprises determining, for each of one or more first virtual disks of the virtual disks, the respective updated maximum queue size; and updating the size of the data store queue for the first virtual machine sent to the first data store comprises updating, for each first virtual disk, the size of the data store queue for the first virtual disk based on the updated maximum queue size for the first virtual disk.

10. The method of claim 9, further comprising:

allocating, for each virtual disk, a corresponding data store queue on the first data store, wherein each data store queue holds the pending requests from the corresponding virtual machine sent to the first data store, and wherein the size of the data store queue is equal to the quantity of pending requests for the corresponding virtual machine sent to the first data store.

11. A system comprising:

data processing apparatus programmed to perform operations comprising:

allocating a respective data store queue to each of a plurality of virtual machines, wherein each data store queue is configured to queue data requests from the respective virtual machine using an initial maximum data store queue size and for a respective virtual disk of a first data store, wherein each virtual machine is associated with a corresponding virtual disk of the first data store and only the virtual machines in the plurality of virtual machines have a virtual disk of the first data store;

determining, for each of the plurality of virtual machines, a respective current maximum quantity of pending requests for the virtual machine, wherein a quantity of pending requests sent from the respective data store queue to the first data store is at most equal to the current maximum quantity of pending requests determined for the virtual machine;

determining, for each of the virtual machines, a respective current quantity of operations per second;

determining, for each of one or more first virtual machines in the plurality of virtual machines, a respective updated maximum queue size using the respective current maximum quantity of pending requests for the virtual machine based on whether the current quantity of operations per second for the first virtual machine is less than an expected quantity of operations per second for the first virtual machine; and updating, for each first virtual machine, the size of the data store queue for the first virtual machine sent to the first data store using the updated maximum queue size for the first virtual machine.

12. The system of claim 11 wherein a total quantity of the pending requests sent to the first data store for the plurality of virtual machines is not greater than a maximum quantity of pending requests for the first data store and the current quantity of operations per second for each of the plurality of virtual machines is not less than the expected quantity of operations per second for the respective virtual machine, and wherein determining, for each of the first virtual machines, the respective updated maximum queue size comprises:

setting the updated maximum queue size for the respective virtual machine to be greater than the maximum quantity of pending requests of the respective virtual machine.

13. The system of claim 11 wherein the current quantity of operations per second for a particular first virtual machine is less than the expected quantity of operations per second for the particular first virtual machine.

14. The system of claim 13 wherein updating, for the particular first virtual machine, the size of the data store queue for the particular first virtual machine sent to the first data store comprises:

determining that a total quantity of pending requests of the first virtual machines sent to the first data store is greater than a maximum quantity of pending requests for the first data store and, in response thereto, configuring a respective virtual disk of a virtual machine from the plurality of virtual machines to send data requests to a second data store.

15. The system of claim 13, wherein:

determining, for the particular first virtual machine, the updated maximum queue size comprises determining the updated maximum queue size using the current maximum quantity of pending requests, the current quantity of operations per second, a target latency, and a current latency of the particular first virtual machine; and updating, for the particular first virtual machine, the size of the data store queue for the particular first virtual machine sent to the first data store comprises updating the size of the data store queue to the updated maximum queue size for the particular first virtual machine.

16. The system of claim 15, wherein the updated maximum queue size $newQ_i$ for the particular first virtual machine i is $$newQ_i = minQ_i + \max(0, \alpha \cdot (curOIO_i - minQ_i))$$

where $$minQ_i = \max(expectedIops_i \cdot targetLatency_i, \delta)$$

$$curOIO_i = currentIops_i \cdot currentLatency_i$$

$$\alpha = \min\left(\frac{currentLatency_i}{targetLatency_i}, \frac{targetLatency_i}{currentLatency_i}\right)$$

where $expectedIops_i$ is the expected quantity of operations per second, $currentIops_i$ is the current quantity of operations per second, $targetLatency_i$ is the target latency, $currentLatency_i$ is the current latency, and $\delta$ is a value between zero and one.

17. The system of claim 11, the operations further comprising:

obtaining, for each of the virtual machines, a respective target latency and the respective expected quantity of operations per second; and wherein determining, for each of the virtual machines, the maximum quantity of pending requests comprises determining the maximum quantity of pending requests, for each of the virtual machines, using the target latency and the expected quantity of operations per second of the virtual machine.

18. The system of claim 17, wherein the maximum quantity of pending requests $minQ_i$ for a virtual machine i in the plurality of virtual machines is $$minQ_i = \max(expectedIops_i \cdot targetLatency_i, \delta)$$

where $expectedIops_i$ is the expected quantity of operations per second, $targetLatency_i$ is the target latency, and $\delta$ is a value between zero and one.

19. The system of claim 11 wherein:

determining a respective maximum quantity of pending requests comprises determining, for a particular virtual machine, a quantity of pending requests for each virtual disk allocated to the particular virtual machine, each of the data store queues configured to queue data requests for the corresponding virtual disk on the first data store;

determining a respective quantity of operations per second comprises determining, for each of the virtual disks, the respective quantity of operations per second;

determining a respective updated maximum queue size comprises determining, for each of one or more first virtual disks of the virtual disks, the respective updated maximum queue size; and updating the size of the data store queue for the first virtual machine sent to the first data store comprises updating, for each first virtual disk, the size of the data store queue for the first virtual disk based on the updated maximum queue size for the first virtual disk.

20. The system of claim 19, the operations further comprising:

allocating, for each virtual disk, a corresponding data store queue on the first data store, wherein each data store queue holds the pending requests from the corresponding virtual machine sent to the first data store, and wherein the size of the data store queue is equal to the quantity of pending requests for the corresponding virtual machine sent to the first data store.

21. A non-transitory machine readable storage medium embodying computer software, the computer software causing a computer to perform a method, the method comprising:
   allocating a respective data store queue to each of a plurality of virtual machines, wherein each data store queue is configured to queue data requests from the respective virtual machine using an initial maximum data store queue size and for a respective virtual disk of a first data store, wherein each virtual machine is associated with a corresponding virtual disk of the first data store and only the virtual machines in the plurality of virtual machines have a virtual disk of the first data store;
   determining, for each of the plurality of virtual machines, a respective current maximum quantity of pending requests for the virtual machine, wherein a quantity of pending requests sent from the respective data store queue to the first data store is at most equal to the current maximum quantity of pending requests determined for the virtual machine;
   determining, for each of the virtual machines, a respective current quantity of operations per second;
   determining, for each of one or more first virtual machines in the plurality of virtual machines, a respective updated maximum queue size using the respective current maximum quantity of pending requests for the virtual machine based on whether the current quantity of operations per second for the first virtual machine is less than an expected quantity of operations per second for the first virtual machine; and
   updating, for each first virtual machine, the size of the data store queue for the first virtual machine sent to the first data store using the updated maximum queue size for the first virtual machine.

22. The machine readable storage medium of claim 21 wherein a total quantity of the pending requests sent to the first data store for the plurality of virtual machines is not greater than a maximum quantity of pending requests for the first data store and the current quantity of operations per second for each of the plurality of virtual machines is not less than the expected quantity of operations per second for the respective virtual machine, and wherein determining, for each of the first virtual machines, the respective updated maximum queue size comprises:
   setting the updated maximum queue size for the respective virtual machine to be greater than the maximum quantity of pending requests of the respective virtual machine.

23. The machine readable storage medium of claim 21 wherein the current quantity of operations per second for a particular first virtual machine is less than the expected quantity of operations per second for the particular first virtual machine.

24. The machine readable storage medium of claim 23 wherein updating, for the particular first virtual machine, the size of the data store queue for the particular first virtual machine sent to the first data store comprises:
   determining that a total quantity of pending requests of the first virtual machines sent to the first data store is greater than a maximum quantity of pending requests for the first data store and, in response thereto, configuring a respective virtual disk of a virtual machine from the plurality of virtual machines to send data requests to a second data store.

25. The machine readable storage medium of claim 23, wherein:
   determining, for the particular first virtual machine, the updated maximum queue size comprises determining the updated maximum queue size using the current maximum quantity of pending requests, the current quantity of operations per second, a target latency, and a current latency of the particular first virtual machine; and
   updating, for the particular first virtual machine, the size of the data store queue for the particular first virtual machine sent to the first data store comprises updating the size of the data store queue to the updated maximum queue size for the particular first virtual machine.

26. The machine readable storage medium of claim 25, wherein the updated maximum queue size $newQ_i$ for the particular first virtual machine i is $$newQ_i = minQ_i + \max(0, \alpha \cdot (curOIO_i - minQ_i))$$

where $$minQ_i = \max(expectedIops_i \cdot targetLatency_i, \delta)$$

$$curOIO_i = currentIops_i \cdot currentLatency_i$$

$$\alpha = \min\left(\frac{currentLatency_i}{targetLatency_i}, \frac{targetLatency_i}{currentLatency_i}\right)$$

where $expectedIops_i$ is the expected quantity of operations per second, $currentIops_i$ is the current quantity of operations per second, $targetLatency_i$ is the target latency, $currentLatency_i$ is the current latency, and $\delta$ is a value between zero and one.

27. The machine readable storage medium of claim 21, the method further comprising:
   obtaining, for each of the virtual machines, a respective target latency and the respective expected quantity of operations per second; and
   wherein determining, for each of the virtual machines, the maximum quantity of pending requests comprises determining the maximum quantity of pending requests, for each of the virtual machines, using the target latency and the expected quantity of operations per second of the virtual machine.

28. The machine readable storage medium of claim 27, wherein the maximum quantity of pending requests $minQ_i$ for a virtual machine i in the plurality of virtual machines is $$minQ_i = \max(expectedIops_i \cdot targetLatency_i, \delta)$$

where $expectedIops_i$ is the expected quantity of operations per second, $targetLatency_i$ is the target latency, and $\delta$ is a value between zero and one.

29. The machine readable storage medium of claim 21 wherein:
   determining a respective maximum quantity of pending requests comprises determining, for a particular virtual machine, a quantity of pending requests for each virtual disk allocated to the particular virtual machine, each of the data store queues configured to queue data requests for the corresponding virtual disk on the first data store;
   determining a respective quantity of operations per second comprises determining, for each of the virtual disks, the respective quantity of operations per second;
   determining a respective updated maximum queue size comprises determining, for each of one or more first virtual disks of the virtual disks, the respective updated maximum queue size; and updating the size of the data store queue for the first virtual machine sent to the first data store comprises updating, for each first virtual disk, the size of the data store queue for the first virtual disk based on the updated maximum queue size for the first virtual disk.

30. The machine readable storage medium of claim 29, the method further comprising:

allocating, for each virtual disk, a corresponding data store queue on the first data store, wherein each data store queue holds the pending requests from the corresponding virtual machine sent to the first data store, and wherein the size of the data store queue equal to the quantity of pending requests for the corresponding virtual machine sent to the first data store.

* * * * *